Erwin PETER
INVENTOR.

BY Karl F. Ross
Attorney

United States Patent Office 3,468,573
Patented Sept. 23, 1969

3,468,573
METHOD OF CONNECTING HOLLOW-PROFILE FRAMES AND FRAME-CONNECTION ASSEMBLY
Erwin Peter, Altheim, Austria, assignor to Vereinigte Metallwerke Ranshofen-Berndorf Aktiengesellschaft Braunau am Inn-Ranshofen, Upper Austria, a corporation of Austria
Filed Dec. 11, 1967, Ser. No. 689,679
Claims priority, application Austria, Dec. 12, 1966, A 11,459/66
Int. Cl. F16b 1/00, 5/00, 7/00
U.S. Cl. 287—189.36                    3 Claims

ABSTRACT OF THE DISCLOSURE

A frame-connection assembly in which a hollow-profile frame is provided with a pair of angular inserts in coextensive relationship loosely fitting between two sides of the hollow frame and stressed thereagainst while a pair of bosses in alignment with one another are pressed into opposite walls of the frame in the plane between the inserts to drive them in opposite directions against the other walls and form protuberances between the inserts which retain themselves under compression against the walls transverse to the depressed walls.

CROSS REFERENCE TO RELATED APPLICATION

This application is related to application Ser. No. 657,882 filed Aug. 2, 1967 and dealing with a system for connecting the hollow profiles of a frame for doors, windows and the like wherein studs are driven from at least one wall of the frame between a pair of angular inserts to wedge them against other walls of the frame and simultaneously provide the studs between the inserts to prevent inward movement and, destressing of them.

The present invention relates to improvements in the connection of hollow profiles and especially improvements in the system of the aforementioned copending application.

BACKGROUND OF THE INVENTION

Prior to the system described in my aforementioned copending application, it has been the common practice to connect hollow profiles by welding corner connectors to the frame, driving male members into the sockets formed by the hollow profiles and fixing them with screws or the like, or cementing, threading or splining angularly inserted plates into the corners of a frame formed between miter-cut profile members. In addition, it has been proposed to drive bosses or the like into the walls of a hollow profile so as to lodge in a groove previously provided in a solid insert substantially filling the cross section of the tubular profile. These systems have the disadvantages that accurate positioning of the bosses or protuberances is not possible in many locations, that vibrations and shocks tend to loosen other corner connectors and difficulties of manipulation and tightening of the corner connection are more characteristic than a fine tight joint.

OBJECTS OF THE INVENTION

It is, therefore, the principal object of the present invention to provide a relatively tight corner-joint assembly for hollow-profile frames wherein the aforementioned disadvantages can be avoided.

A further object of this invention is to provide a connecting assembly for hollow profiles at the corners of frames and the like which extends principles first set forth in my copending application mentioned earlier and which allows a tight junction at low cost.

Yet another object of this invention is the provision of an improved method of forming a corner junction of better characteristics as mentioned above.

BRIEF SUMMARY OF THE INVENTION

I have found that the foregoing objects and others which will become apparent hereinafter can be achieved by providing a corner-junction assembly for hollow-profile frames and especially frames of a generally rectangular cross section and profile wherein, at the corner junction of two miter-cut members, a pair of angular, substantially coextensive inserts are received and are stressed against the walls of the profile members. The invention provides for the driving of a pair of bosses into opposing parallel walls of the profile in a plane extending parallel to the interface between the inserts so as to deform the inserts in the direction of one another and provide protuberances at the interface which hold the inserts under stress against a pair of walls of the hollow profile which are parallel to the plane of the interface. Concurrently, the formation of the bosses by deformation of the lateral walls serve to wedge the inserts transversely against the walls of the profiles parallel to the aforementioned plane.

BRIEF DESCRIPTION OF THE FIGURES

The above and other objects, features and advantages of the present invention will become more readily apparent from the following description, reference being made to the accompanying drawing in which.

DETAILED DESCRIPTION OF THE DRAWING

Figure 1:
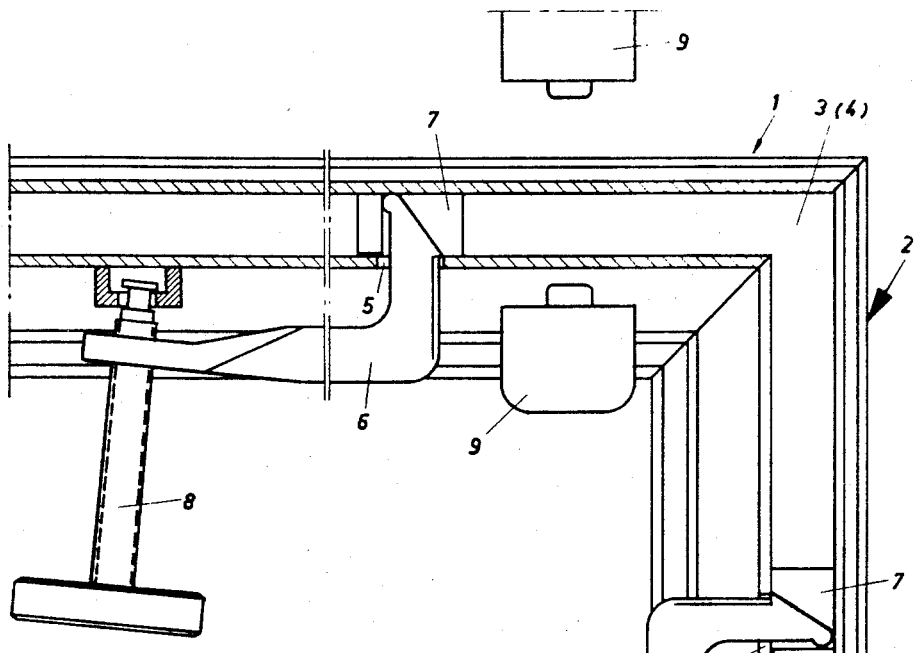
FIG. 1 is a cross-sectional view, taken along the plane parallel to the plane of the frame, of a corner junction of the frame made with hollow-profile members.
Figure 2:
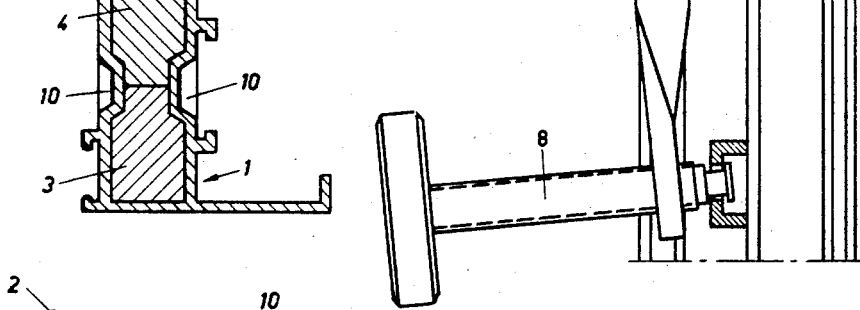
FIG. 2 is a cross section taken in one plane perpendicular to the plane of FIG. 1 through the corner junctions.
Figure 3:
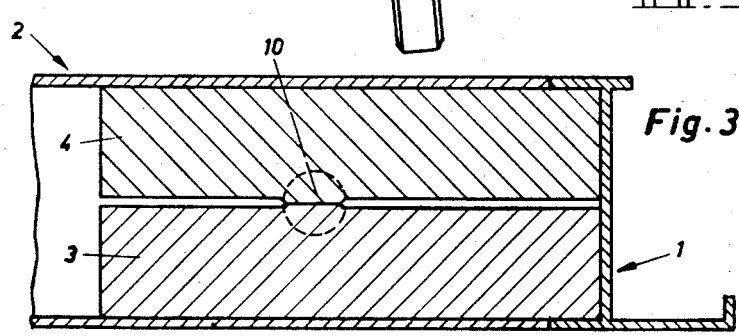
FIG. 3 is a cross section through the same region but in a plane perpendicular to both the planes of FIGS. 1 and 2.

As shown in FIGS. 1–3, the corner junction of the present invention comprises a pair of miter-cut hollow-profile members 1 and 2 which form a right-angle junction receiving a pair of coextensive corner inserts 3 and 4 of right-angle configuration, the corner inserts having a common insert in a median plane of the profile as shown for example at the center of FIGS. 2 and 3. The profile (see FIG. 2) has a pair of walls (right- and left-hand sides of the inserts 3 and 4 in FIG. 2) extending perpendicularly to this interfacial plane and a pair of walls (top and bottom in FIG. 2) extending parallel to the plane.

Angle levers 6 are provided at least temorarily to produce a prestress of the corner inserts as described in my application Ser. No. 657,882 mentioned above. The angle levers 6 pass through openings 5 in the inner side wall of the profile 1 (left-hand wall in FIG. 2) or in the profile 2, these openings registering with recesses 7 in the angular inserts 3 and 4. Tightening of the screws 8 tends to draw the profile members 1 and 2 tightly against the inserts 3 and 4, thereby prestressing the profiles and the inserts. Using a pair of hydraulic plungers 9 having nipples facing the walls of the frame member 1 and of a configuration corresponding to the hollows of the bosses 10 shown in FIG. 2, the pistons 9 are hydraulically driven against the profile members such that the nipples lie in the plane of the interface of the inserts 3 and 4 (substantially the median plane through the assembly as shown in FIG. 2), to deform the hollow-profile walls (left- and right-hand walls of FIG. 2) and thereby drive the inserts 3 and 4 downwardly and upwardly under compression against the upper and lower walls as shown in FIG. 2. Not only are the side walls deformed, but the nipples of the hydraulic plungers 9 plastically deform the inserts 3 and 4 to provide protuberances 10 which engage one another and span the gap between the inserts (FIG. 3) resulting from the stressing of the inserts against the walls of the profile parallel to the plane of their interface. Thus the inserts 3 and 4 are held in place by the bosses 10 which project into the body of the inserts while the protuberances 10 retain the inserts 3 and 4 against inward movement to prevent loosening of the junction. Members 6 and 8 can then be removed.

I claim:

1. A corner-junction assembly, comprising a pair of angularly adjoining hollow-profile frame sections, each having at least two pairs of opposing walls spaced apart across the interior of the respective hollow section; a pair of geometrically similar and plastically deformable angular insert bodies each having its legs joined at the angle of the junction between said sections and received within the interiors thereof, said insert bodies being juxtaposed across an interface running perpendicularly to the walls of one of said pairs; and at least one pair of bosses formed in situ in said walls of said one of said pairs projecting into said bodies along the interface between them and forcing them apart into engagement with the walls of the other of said pairs, said bodies being provided in the region of said bosses with deformations coextensive with said bosses and with mutually engaging lateral protuberances retaining said bodies against said walls of said other pairs.

2. The assembly defined in claim 1, further comprising means on said sections and said bodies enabling clamping of said sections at said junction relatively to said bodies.

3. The assembly as defined in claim 2 wherein said means includes openings formed in said sections, and recesses formed in said bodies in alignment with openings in said sections for receiving clamping members adapted to pass through said openings.

References Cited

UNITED STATES PATENTS

| | | |
|---|---|---|
| 2,861,659 | 11/1958 | Hagerty et al. |
| 3,120,023 | 2/1964 | Ustin. |
| 3,317,227 | 5/1967 | Nijhuis. |

FOREIGN PATENTS

| | | |
|---|---|---|
| 1,266,189 | 5/1961 | France. |
| 429,098 | 7/1967 | Switzerland. |

CARL W. TOMLIN, Primary Examiner

W. L. SHEDD, Assistant Examiner

U.S. Cl. X.R.

29—446, 517; 52—475, 656